G. CHINNOCK.

LAMP-BURNER.

No. 7,445.

Reissued Dec. 26, 1876.

Witnesses,
Chandler Hall.
Thomas E. Birch.

Geo. Chinnock

THE GRAPHIC CO. N.Y.

UNITED STATES PATENT OFFICE.

GEORGE CHINNOCK, OF NEW YORK, N. Y.

IMPROVEMENT IN LAMP-BURNERS.

Specification forming part of Letters Patent No. 77,254, dated April 28, 1868; reissue No. 7,445, dated December 26, 1876; application filed November 22, 1876.

*To all whom it may concern:*

Be it known that I, GEORGE CHINNOCK, of New York, in the county and State of New York, have invented certain new and useful Improvements in Means for Illumination, of which the following is a description:

The object of this invention is, primarily, to provide for free transmission of light outward and downward.

The invention consists in a piece of translucent or transparent material for use in combination with a burner; also, in the combination therewith of a translucent or transparent deflector-shell, means for inducing a draft of air to a flame issuing from the burner, and means for retaining the latter in place, whereby the desired results are obtained in a very simple and inexpensive manner.

The accompanying drawing illustrates my invention embodied in a lamp-burner.

Figure 1:
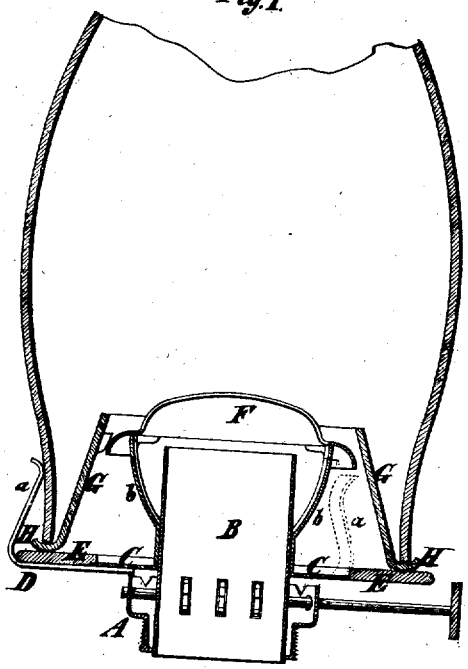
Figure 2:
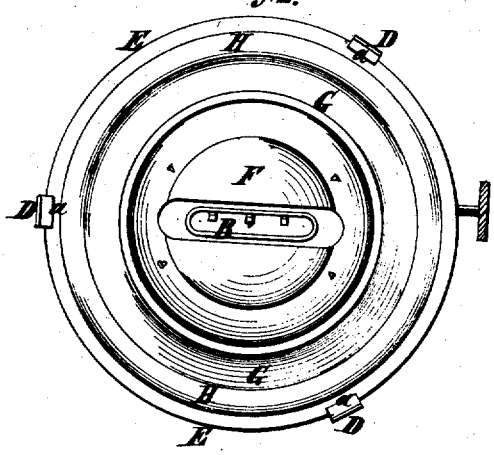

Figure 1 is a central vertical section of such a burner and certain appurtenances thereof, and Fig. 2 is a plan or top view of the burner alone.

Similar letters of reference designate corresponding parts in both figures.

A designates the base of the burner; B, a wick-tube, and C an air-inlet or air-distributer, shown as consisting of a thin plate perforated with small holes. The burner is provided with means for supporting translucent or transparent material, represented as consisting of arms D, made of flat strips of sheet metal, turned up at the outer ends to form springs *a*, serving to retain in place means for inducing a draft of air to a flame issuing from the burner.

The piece of translucent or transparent material for use in combination with the air-inlet or air-distributer, to provide for the free transmission of light downward, is represented as made in the form of a rim, disk, or annular plate, E, and as resting on the arms D.

G designates a translucent or transparent shell surrounding the wick-tube B, and serving to deflect air upon a flame issuing therefrom. It is shown as provided at the base with a flange or rim, H, which is adapted to support means for inducing a draft of air to the flame, said means being retained laterally in place by the springs *a*. It will be observed that as the flange H of the shell G is also made of translucent or transparent material, provision is afforded by it for the free transmission of light outward as well as downward. As the shell G rests on the translucent or transparent material E, and the means for inducing a draft of air to the flame are supported upon the flange H of shell G, the said translucent or transparent material E serves to support the said means for inducing the draft of air to the burner. F designates a deflector-tip, shown as supported by arms *b* in such relation to the shell G that the two will deflect air properly upon a flame issuing from the burner to support combustion. Inasmuch as the light from the flame of the burner may pass freely downward through the transparent rim E, it follows that the utility of the burner is materially increased, as compared with that resulting when the base of the burner is of an opaque or non-transparent character, as in the ordinary manner. Furthermore, the shell G, by deflecting toward the flame a sufficient proportion of the air which rises through the air-inlet or air-distributer of the burner, insures the most brilliant burning of the flame at the same time that the outward transmission or radiation of the light therefrom is not interfered with in the least.

What I claim as my invention, and desire to secure by Letters Patent, is—

1. A piece of translucent or transparent material made separate from the air distributer or inlet of a burner, and independent of a deflector, and extending laterally outward beyond the outer circumference of the air-inlet or air-distributer plate, to support means for inducing a draft of air to a flame issuing from a burner.

2. A rim, disk, or plate of translucent or transparent material made separate from the air distributer or inlet of a burner, and independent of a deflector, and extending laterally outward beyond the outer circumference of the air-inlet or air-distributer plate, to support means for inducing a draft of air to a flame issuing from a burner.

3. The combination, with a piece of translucent or transparent material made separate from the air distributer or inlet of a burner, and independent of a deflector, and extending laterally outward beyond the outer circumference of the air-inlet or air-distributer plate, to support means for inducing a draft of air to the burner, of spring-arms for impinging on the outside of the latter to retain it in place.

4. The combination, with a piece of translucent or transparent material made separate from the air distributer or inlet of a burner, and independent of a deflector, and extending laterally outward beyond the outer circumference of the air-inlet or air-distributer plate, of a translucent or transparent deflector-shell made separate from the deflector-tip, and supported on said piece of translucent or transparent material.

5. A translucent or transparent deflector-shell made separate from the air distributer or inlet of a burner and from the deflector-tip, and provided with an outwardly-extending translucent or transparent portion, adapted to support means for inducing a draft of air to a burner.

6. The combination, with a burner and a piece of translucent or transparent material made separate from the air distributer or inlet and deflector of a burner, of a translucent or transparent deflector-shell made separate from the deflector-tip, and provided with an outwardly-extending translucent or transparent portion, adapted to support means for inducing a draft of air to a burner.

GEO. CHINNOCK.

Witnesses:
CHANDLER HALL,
THOMAS E. BIRCH.